Figure 5:
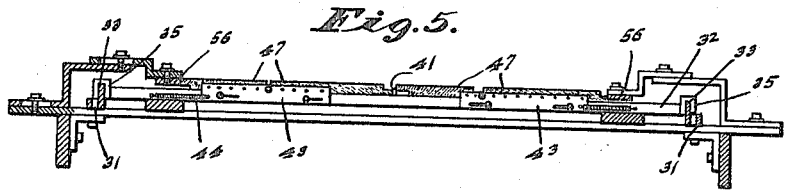

J. H. GREENSTREET.
BOX BLANK MACHINE.
APPLICATION FILED DEC. 4, 1913.
1,145,834.
Patented July 6, 1915.
5 SHEETS—SHEET 1.
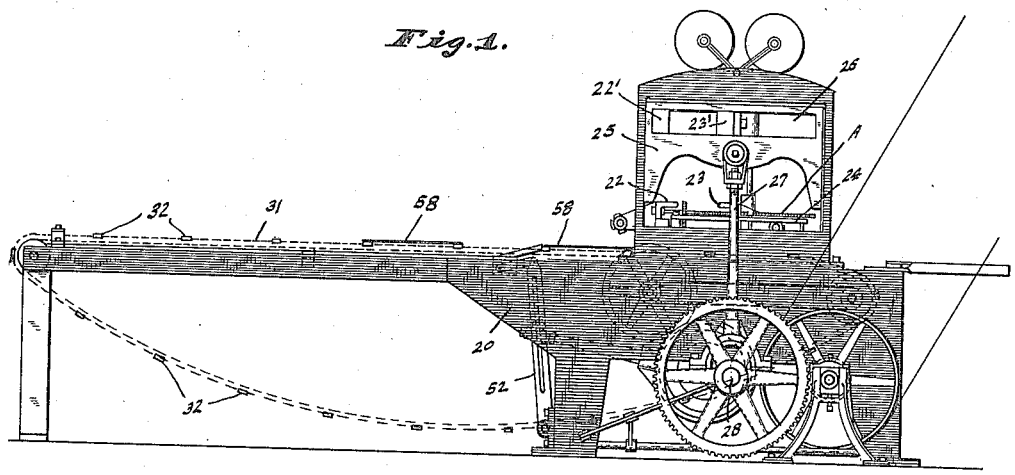
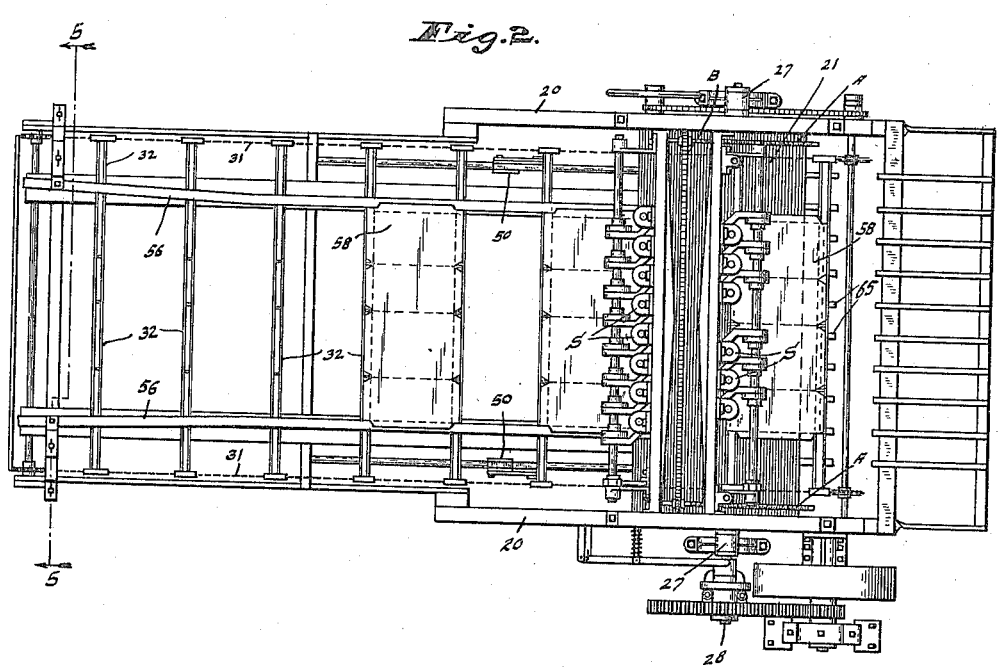
WITNESSES:
Frank A. Fahle
Josephine Gasper
INVENTOR
Jason H. Greenstreet,
BY
Arthur M. Hood
ATTORNEY

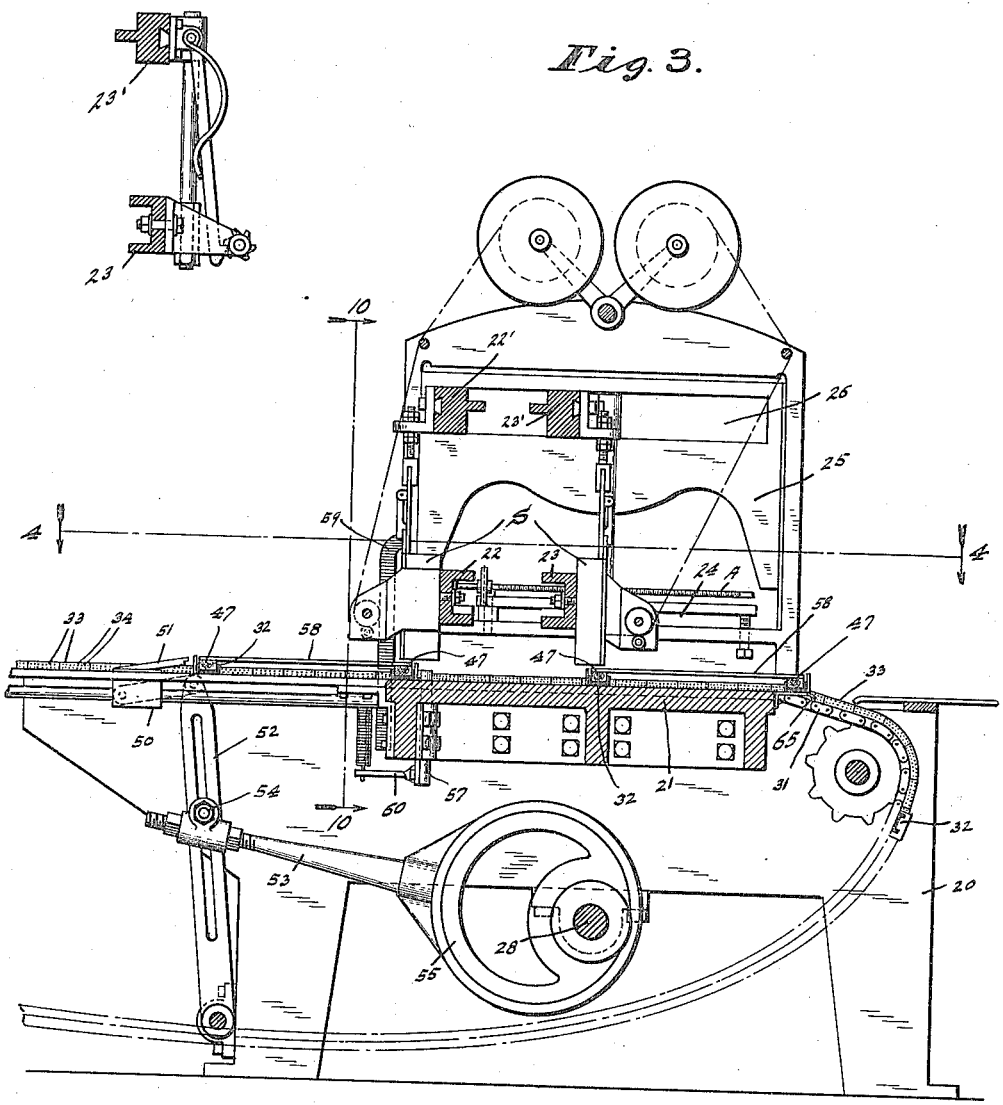

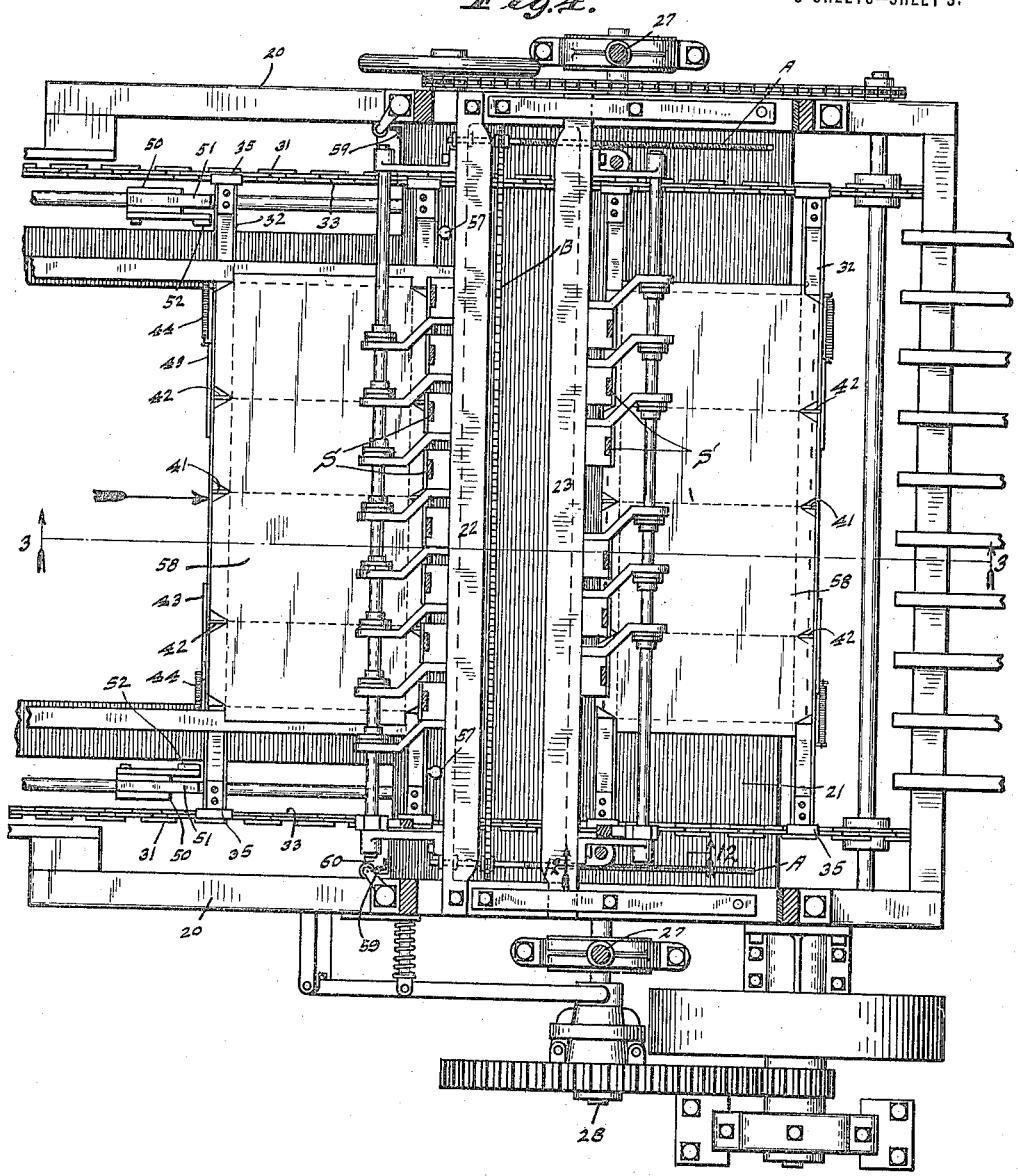

J. H. GREENSTREET.
BOX BLANK MACHINE.
APPLICATION FILED DEC. 4, 1913.

1,145,834.

Patented July 6, 1915.
5 SHEETS—SHEET 4.

WITNESSES:
Frank A. Fahle
Josephine Gasper

INVENTOR
Jason H. Greenstreet,
BY
Arthur M. Hood
ATTORNEY

J. H. GREENSTREET.
BOX BLANK MACHINE.
APPLICATION FILED DEC. 4, 1913.

1,145,834.

Patented July 6, 1915.
5 SHEETS—SHEET 5.

WITNESSES:
Frank A. Fahle
Josephine Gasper

INVENTOR
Jason H. Greenstreet,
BY
Arthur M. Hood
ATTORNEY

UNITED STATES PATENT OFFICE.

JASON H. GREENSTREET, OF INDIANAPOLIS, INDIANA, ASSIGNOR TO FLORA V. GREENSTREET, OF INDIANAPOLIS, INDIANA.

BOX-BLANK MACHINE.

1,145,834.     Specification of Letters Patent.     Patented July 6, 1915.

Application filed December 4, 1913. Serial No. 804,581.

*To all whom it may concern:*

Be it known that I, JASON H. GREENSTREET, a citizen of the United States, residing at Indianapolis, in the county of Marion and State of Indiana, have invented a new and useful Box-Blank Machine, of which the following is a specification.

The object of my invention is to produce a machine for the production of box blanks consisting of cleats and sheet material stapled together, the construction being such that a considerable number of staples may be driven simultaneously into the blank, the form of the machine shown in the drawings being such that as many staples are driven in a single operation as are to be found in a completed blank.

The accompanying drawings illustrate my invention.

Figure 6:
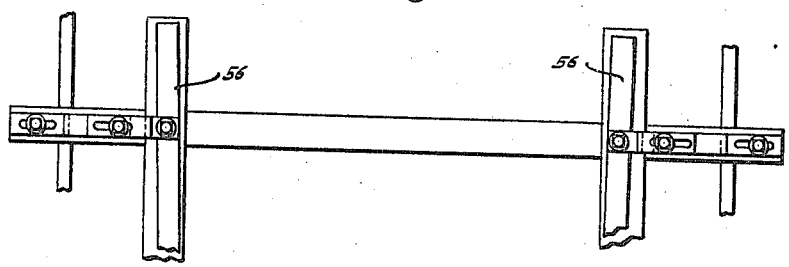
Figure 7:
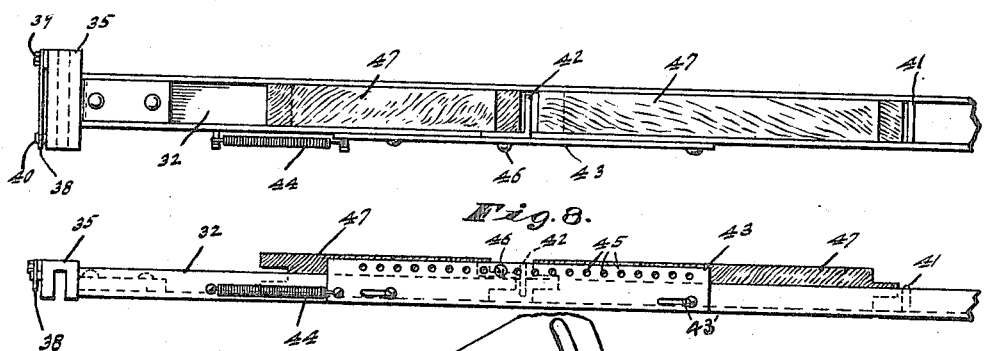
Figure 8:
Figure 9:
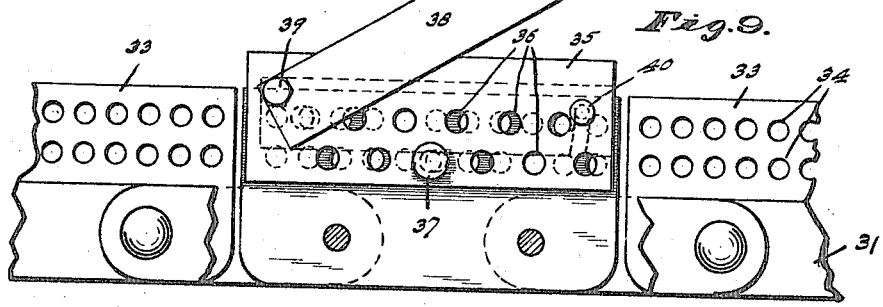
Figure 10:
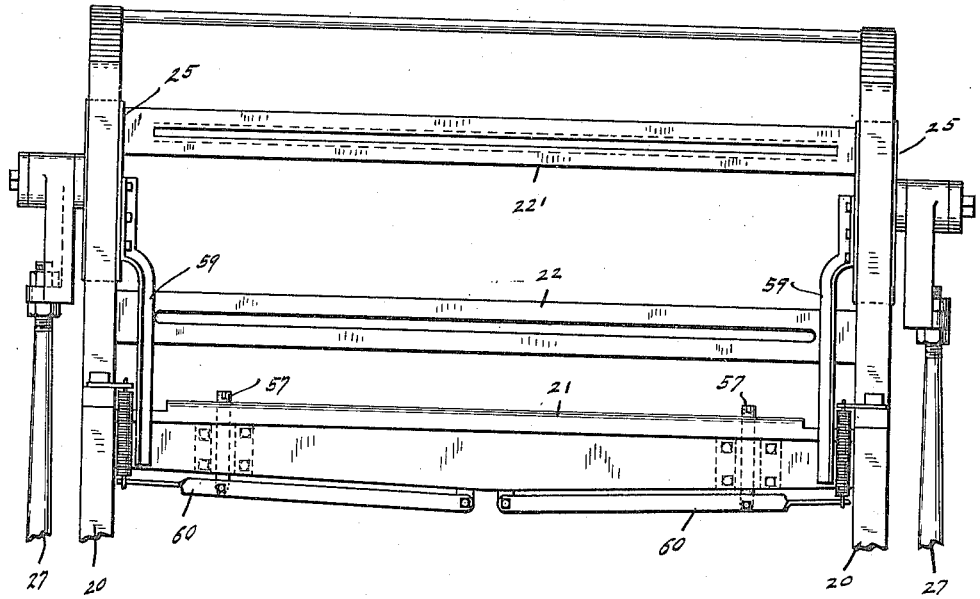
Figure 11:
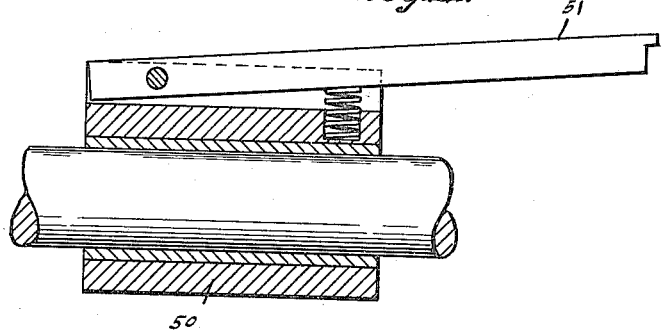
Figure 13:
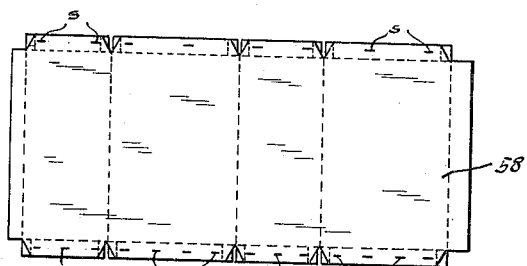

Figure 1 is a side elevation of the complete machine from the power side; Fig. 2 a plan; Fig. 3 a vertical section on line 3—3 of Fig. 4; Fig. 4 a section of the parts shown in Fig. 3, on line 4—4 of Fig. 3; Fig. 5 a section, on a larger scale, on line 5—5 of Fig. 2; Fig. 6 a fragmentary plan of the adjustable mounting for the cleat positioners; Fig. 7 a fragmentary plan of one of the cleat holders; Fig. 8 an elevation of the parts shown in Fig. 7; Fig. 9 an enlarged detail of the adjustable connection between the carrying chain and one of the cleat holders; Fig. 10 a fragmentary elevation on line 10—10 of Fig. 3 of the blank positioning stops and the mechanism for withdrawing the same; Fig. 11 a fragmentary detail on an enlarged scale of the pusher by means of which the carrying chain is fed through the machine; Fig. 12 a section on line 12—12 of Fig. 3; and Fig. 13 a plan of one form of box blank producible in the machine, said blank being shown in the condition in which it is just before the final stapling operation upon it.

In the drawings, 20 indicates the main frame of the machine provided with a work table, anvil, or set of anvils, 21 across which the box material will be fed and over which is arranged the stapling mechanism or other suitable means for effecting a connection between the sheets, cleats and binding wires or binding members. The stapling mechanism, which is the connection-effecting means most commonly employed in this art, comprises a plurality of staple-forming and driving devices S which, in practice, are of necessity of such strength and dimension as to automatically form and drive a wire staple of sufficient strength to hold the materials of the box blank together, and in practice it has heretofore been found that each of said heads occupies a space exceeding three inches in width and in the production of box blanks it is found that in most instances it is desirable, for strength, to have the staples not more than three inches apart. As a consequence, I provide two carrying heads 22 and 23 upon which the main bodies of the staple-forming-and-driving devices S are mounted, in a common manner, so as to be longitudinally adjustable upon the carrying head 22 or 23, the arrangement being such that, by staggering the devices S carried by the bar or head 22, relative to the devices S carried by the bar or head 23, any desired spacing of the staples in the finished blank may be obtained. The two heads 22 and 23 are vertically stationary and the head 22 is conveniently horizontally stationary while the head 23 is horizontally slidable in guideways 24 and held in adjusted relationship to the head 22 by means of the adjusting screws A, A connected by sprocket chain B. The staple driving members of the devices S are vertically reciprocable members which are carried by vertically reciprocating heads 22' and 23', respectively, associated with the heads 22 and 23 in the well known manner and as the details of construction of these staple-forming-and-driving devices S are well known and in common use, no attempt has been made to indicate the same except in a most general way. The two reciprocating heads 22' and 23' are carried at their ends in vertically reciprocating cross heads 25, 25 each of which is provided with a horizontal slot or guideway 26 in which the head 23' may shift longitudinally so as to at all times lie vertically above its companion cross head 23, the position of which is determined by the adjustment of screws A.

The cross heads 25, 25 are reciprocated by pitmen 27, 27 which in turn are connected to the usual eccentrics carried by the main drive shaft 28. Running across the work table 21, transversely of the stapling planes, is a feed chain comprising two endless chain belts 31, 31 and connecting cross bars 32, which cross bars are upwardly presented channels which form cleat holders. In order that the cleat holders 32 may be adjusted relatively to each other to any desired spacing, each link of the belts 31 is provided with a vertically arranged plate 33, parallel with the chain plane, which plate is provided with a plurality of holes 34. Each cleat holder at each end is then provided with a head 35 which is an inverted U and the depending arms of this head are perforated with holes 36 which are so spaced that only one of these holes can be brought into registry, at any one time, with the holes 34, but such that any one of the holes 36 may be brought into registry with some one of the holes 34, thus providing for many positions of adjustment of the head 35 within the range of adjustment. A pin 37 is provided for insertion into the registering holes 36—34 and this pin is held in place by a latch bar 38 pivoted at 39 upon the head 35 and engaging the lock pin 40.

The length of each cleat holder 32 is slightly in excess of the length of the longest box blank to be produced by the machine and at its middle each cleat guide is preferably provided with a fixed cleat spacer 41. At each side of the cleat spacer 41 I provide a movable spacer 42 which is conveniently carried by a plate 43 slidably mounted upon the cleat holder 32 by a pin-and-slot connection 43' and normally urged away from the spacer 41 by a spring 44. The plate 43 is provided with a plurality of holes 45 extending along its length for the reception of a pin or screw 46 by means of which the spacer 42 is held upon the plate in any desired position of its length so that any desired general relationship between the fixed spacer 41 and the movable spacer 42 may be arranged so as to accommodate a cleat 47 of any desired length between the two spacers 41 and 42 and another cleat 47 of any desired length beyond the spacer 42. As a general rule, box blanks are made for four-sided boxes and consequently as a general rule there will be one fixed spacer 41 and two movable spacers 42 in each cleat holder.

The feed chain, comprising the chains 31 and the cleat holders 32, is intermittently advanced through the machine a distance equal to the space between two cleat holders, by any suitable means, that shown in the present drawings comprising reciprocating pawl carriers 50 each carrying a vertically swinging pawl 51 which is adapted to move freely beneath the cleat holder and, coming up behind it, engage the holder to drive it forwardly toward the stapling plane. The pawl carriers 50 are reciprocated by levers 52 which in turn are reciprocated by pitmen 53 adjustably connected to the levers at 54 and driven by a suitable eccentric 55 carried by the main drive shaft 28, the eccentrics 55 being timed with relation to the eccentrics which drive the pitmen 27 so that a forward movement of the feed chains will begin immediately upon the beginning of upward movement of the heads 22' and 23'. The feed chain is extended for a considerable distance upon the initial side of the machine, as shown at the left of Fig. 1, and operators standing at each side of the initial end of the machine will place cleats 47 in the cleat holders as they arrive, the spacers 42 being sufficiently spaced from the spacer 41 to permit the ready insertion of the cleats in proper sequence, and, as the chain is driven forwardly through the machine, the outer ends of the outer cleats will come into engagement with inclined guides 56 which are extended to the first stapling plane where they are conveniently carried by the outer stapling devices S, S, as indicated in Fig. 2, the arrangement being such that, by the time any cleat holder has reached this stapling plane, the cleats within that cleat holder have been shoved endwise by the guides 56, 56 so as to be properly spaced from each other. As each cleat holder arrives at the stapling plane, its position is determined by stop pins 57, 57 which project up through the work table 21 in proper relationship to the first set of stapling devices S, S carried by the head 22 so that the cleats within the cleat holder will lie immediately beneath the staple driving mechanism as is clearly indicated in Fig. 3. By this time an operator (or perhaps two operators, one upon each side of the machine) has placed the sheet material 58 upon the cleats carried by two adjacent cleat holders and the staple driving mechanism carried by the cross head 22 thereupon acts upon the material to drive one set of staples $s$ as indicated in the upper part of Fig. 13. Thereupon the material is advanced through the machine another step so as to bring the first cleat holder beneath the stapling mechanism carried by the cross head 23, this forward movement of the feed chains being permitted by a withdrawal of the stop pins 57, which withdrawal is accomplished by means of the fingers 59, 59 carried by the head 25 and engaging the spring controlled levers 60—60 (Fig. 10) which are connected to the pins 57.

When the material has been again advanced in the machine the stapling mechanisms carried by the cross head 23 will drive a set of staples $s'$ into the cleats which have previously received staples from the mechanism carried by the head 22 and the stapling mechanisms carried by the head 22 will at the same time be driving a set of staples $s$ in to the succeeding set of cleats. When the machine has been once started, it will be noted that as many staples are driven at each operation of the machine as are necessary for a completed blank and the capacity of the machine is, therefore, a completed blank for each two reciprocations of the machine. In the production of box blanks with this machine, the sheet material 58 is, of course, co-extensive with the blank either in the form of flexible sheet material such as strawboard or in the form of separate sections previously connected by some sort of flexible connecting members, such as hinges, binding wires, etc.

A number of machines have heretofore been produced for connecting cleat and sheet material by staples but, so far as I am aware, such machines have always embodied means for movement of the cleats relative to the stapling mechanism lengthwise of the cleat series so that a single staple-forming-and-driving mechanism for each row of cleats was all that could be provided and as many reciprocations of the staple-forming-and-driving mechanisms were required as the number of staples in any longitudinal series of cleats. In view of the fact that reciprocation of the staple-forming-and-driving mechanisms now commonly in use in the art cannot be made with too great rapidity, because of the inertia of the box material and its feeding mechanism, it is evident that the prior machines have been limited in capacity because of the time required in the driving of the staples. My present machine is radically differentiated from such prior machines, therefore, by the fact that the cleats, instead of being fed lengthwise through the machine are fed cross-wise through the machine and by such means it becomes possible to drive, at a single reciprocation of the staple-forming-and-driving mechanisms, all of the staples required for a single blank.

Of course it will be readily understood that where the staples need not be closer together than the distance between the arrangement of the staple-forming-and-driving means S upon any one cross head, the entire blank may be placed initially beneath both sets of stapling mechanisms and all of the staples driven in a single blank at one operation, and the feeding mechanism then moved to bring the next blank into full stapling position. This arrangement would double the output of the machine.

The cleats may, at times, stick in the carriers as they are withdrawn from the working plane and I therefore mount several spring fingers 65 at the discharge end of the table 21 so arranged that, as each carrier 32 is drawn beyond the fingers, said fingers will lift the cleats from the carrier.

While I have many times referred to staple-forming-and-driving mechanisms, it will be readily understood that any desired mechanism may be utilized for establishing a connection between the cleats and sheet material.

I claim as my invention:

1. In a box blank forming machine, the combination of two sets of means for driving a plurality of staples, the two sets spaced apart a distance corresponding to the lateral spacing of the cleats in a finished blank and the staple-driving means of one set laterally staggered relatively to those of the other set, and means for presenting to each of said staple driving means the same succession of cleats and associated sheet material by a relative movement between the cleats and staple driving means in a direction transverse to the cleats.

2. In a box blank forming machine, the combination of two sets of means for effecting a connection between cleats and sheet material of a box blank, the two sets spaced apart a distance corresponding to the lateral spacing of the cleats in a finished blank and the connection-effecting means of one set laterally staggered relatively to those of the other set, and means for presenting to each of said connection-effecting means the same succession of cleats and associated sheet material by a relative movement between the cleats and connection-effecting means in a direction transverse to the cleats.

3. In a box blank forming machine, the combination of two series of staple-driving mechanisms spaced apart a distance corresponding to the lateral spacing of the cleats in the desired box blank, an endless feed chain comprising transverse cleat holders each constructed and arranged to receive a series of cleats forming a longitudinal series for the desired box blank, cleat spacing members carried by each of said cleat holders and comprising a spacing member longitudinally movable in its cleat holder, means for automatically compacting the cleats and spacers within each cleat holder, and means for driving the feed chains through the stapling plane in coördination with the staple-driving mechanisms.

4. In a box blank forming machine, the combination of a series of staple-driving mechanisms, an endless feed chain comprising transverse cleat holders, each constructed and arranged to receive a series of cleats forming a longitudinal series for the desired box blank, cleat spacing members carried by each of said cleat holders and comprising a spacing member longitudinally movable in its cleat holder, means for automatically compacting the cleats and spacers within each cleat holder, and means for driving the feed chain through the stapling plane in coördination with the staple-driving mechanisms.

5. In a box blank forming machine, the combination of two series of staple driving mechanisms spaced apart a distance corresponding to the lateral spacing of the cleats in the desired box blank, an endless feed chain comprising transverse cleat holders each constructed and arranged to receive a series of cleats forming a longitudinal series for the desired box blank, and means for driving the feed chain through the stapling plane in coördination with the staple-driving mechanisms.

6. In a box blank forming machine, the combination of two series of staple-driving mechanisms spaced apart a distance corresponding to the lateral spacing of the cleats in the desired box blank, an endless feed chain comprising transverse cleat holders, each constructed and arranged to receive a series of cleats forming a longitudinal series for the desired box blank, cleat spacing members carried by each of said cleat holders and comprising a spacing member longitudinally movable in its cleat holder, and means for driving the feed chain through the stapling plane in coördination with the staple-driving mechanisms.

7. In a machine of the class described, a cleat holder for receiving and holding a series of cleats for forming a longitudinal series of cleats for a desired box blank, said cleat holder comprising a plurality of cleat spacers, one of said cleat spacers being movable lengthwise of its holder and relatively to another spacer, means for normally moving said movable spacer away from its companion spacer, and means for automatically compacting the cleats and spacers within the holder.

8. In a machine of the class described, a cleat holder for receiving and holding a series of cleats for forming a longitudinal series of cleats for a desired box blank, said cleat holder comprising a plurality of cleat spacers, one of said cleat spacers being movable lengthwise of its holder and relatively to another spacer, and means for normally moving said movable spacer away from its companion spacer.

9. In a machine of the class described, a cleat holder for receiving and holding a series of cleats for forming a longitudinal series of cleats for a desired box blank, said cleat holder comprising a plurality of cleat spacers, one of said cleat spacers being movable lengthwise of its holder and relatively to another spacer, and means for automatically compacting the cleats and spacers within the holder.

In witness whereof, I have hereunto set my hand at Indianapolis, Indiana, this 29th day of November, A. D. one thousand nine hundred and thirteen.

JASON H. GREENSTREET.

Witnesses:
 ARTHUR M. HOOD,
 FRANK A. FAHLE.